United States Patent
Reppich et al.

(10) Patent No.: US 12,189,059 B2
(45) Date of Patent: Jan. 7, 2025

(54) EYE-SAFE LIDAR SYSTEM HAVING AN ADJUSTABLE SCANNING RANGE

(71) Applicant: Robert Bosch GmbH, Stuttgart (DE)

(72) Inventors: Raimund Reppich, Ludwigsburg (DE); Annette Frederiksen, Renningen (DE); Nico Heussner, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1061 days.

(21) Appl. No.: 17/056,148

(22) PCT Filed: Jul. 10, 2019

(86) PCT No.: PCT/EP2019/068528
§ 371 (c)(1),
(2) Date: Nov. 17, 2020

(87) PCT Pub. No.: WO2020/038647
PCT Pub. Date: Feb. 27, 2020

(65) Prior Publication Data
US 2021/0215801 A1 Jul. 15, 2021

(30) Foreign Application Priority Data
Aug. 22, 2018 (DE) .......................... 102018214209.2

(51) Int. Cl.
*G01S 7/481* (2006.01)
*G01S 17/04* (2020.01)
(52) U.S. Cl.
CPC .......... *G01S 7/4817* (2013.01); *G01S 7/4814* (2013.01); *G01S 17/04* (2020.01)

(58) Field of Classification Search
CPC ............................. G01S 7/4814; G01S 7/4817
See application file for complete search history.

(56) References Cited

U.S. PATENT DOCUMENTS 6,856,919 B1 * 2/2005 Bastian ................. G01S 17/931
250/236
9,121,703 B1 * 9/2015 Droz ....................... G01S 17/42
(Continued)

FOREIGN PATENT DOCUMENTS

| CN | 207249108 U | * | 4/2018 |
| CN | 108008371 A | | 5/2018 |

(Continued)

OTHER PUBLICATIONS

Machine Translation of CN-207249108-U (Year: 2018).*
International Search Report for PCT/EP2019/068528, Issued Oct. 18, 2019.

*Primary Examiner* — Yuqing Xiao
*Assistant Examiner* — Jempson Noel
(74) *Attorney, Agent, or Firm* — NORTON ROSE FULBRIGHT US LLP; Gerard A. Messina

(57) ABSTRACT

A lidar system for scanning a scanning range. The lidar system includes a transmitter unit for generating beams and for emitting the generated beams along a scanning range, the transmitter unit having at least one radiation source. The lidar system also includes at least one receiver unit for receiving and evaluating beams reflected or scattered back in the scanning range. The scanning range acted upon by the generated beams is subdivided into at least two sections. At least one first section is scanned using a higher radiant power than a second section of the scanning range. A control unit is also described.

13 Claims, 4 Drawing Sheets

(56) References Cited

U.S. PATENT DOCUMENTS

| | | | |
|---|---|---|---|
| 9,618,622 B2* | 4/2017 | Geiger | G01S 7/4811 |
| 10,401,481 B2* | 9/2019 | Campbell | G01S 17/931 |
| 10,670,726 B2* | 6/2020 | Suzuki | G01S 11/12 |
| 10,908,264 B2* | 2/2021 | O'Keeffe | G01S 7/489 |
| 2016/0282468 A1 | 9/2016 | Gruver et al. | |
| 2018/0059221 A1 | 3/2018 | Slobodyanyuk et al. | |
| 2018/0088214 A1 | 3/2018 | O'Keeffe | |
| 2019/0310349 A1* | 10/2019 | Wilmer | G01S 17/89 |
| 2020/0241165 A1* | 7/2020 | Kare | H01S 5/0085 |

FOREIGN PATENT DOCUMENTS

| | | |
|---|---|---|
| DE | 19910667 A1 | 9/2000 |
| DE | 102005045302 A1 | 3/2007 |
| EP | 2184616 A2 | 5/2010 |
| JP | 2018517889 A | 7/2018 |
| WO | 2018044958 A1 | 3/2018 |

* cited by examiner

EYE-SAFE LIDAR SYSTEM HAVING AN ADJUSTABLE SCANNING RANGE

FIELD

The present invention relates to a lidar system for scanning a scanning range, including a transmitter unit for generating beams and for emitting the generated beams along a scanning range, the transmitter unit having at least one radiation source; and the lidar system including at least one receiver unit for receiving and evaluating beams reflected or scattered back in the scanning range. In addition, the present invention relates to a control unit.

BACKGROUND INFORMATION

Customary lidar (light detection and ranging) systems are made up of a transmitter unit and a receiver unit. The transmitter unit generates and emits electromagnetic beams continuously or in a pulsed manner. If these beams strike a moving or stationary object, the beams are reflected by the object in the direction of the receiver unit. The receiver unit may detect the reflected electromagnetic radiation and assign the reflected beams a time of receipt. This may be used, for example, within the scope of a time of flight analysis for ascertaining a distance of the object from the lidar system.

For lidar systems, the range, the resolution and the scanning range, that is, the so-called field of view (FoV), are relevant parameters, which characterize the performance of lidar systems. In particular, the range of a lidar system is mainly a function of the power of the radiation source. Lasers are frequently used as radiation sources. The products including the utilized lasers must be classified according to the IEC 60825-1 standard. In view of eye safety, only the limiting values of laser class 1 are regarded as safe in the case of lasers in the infrared wavelength range. This is particularly problematic in applications of lidar systems, which require a large range. The maximum range of a lidar system may be regarded as proportional to the power of the radiation source.

In order for the standard of laser safety to be met, the transmitted power of the radiation source must be limited, which reduces the range, as well.

SUMMARY

An object of the present invention is to provide a lidar system, which is safe for the eyes and has an increased range.

This object may be achieved in accordance with example embodiments of the present invention. Advantageous refinements of the present invention are described herein.

According to one aspect of the present invention, a lidar system for scanning a scanning range is provided. In accordance with an example embodiment of the present invention, the lidar system includes a transmitter unit for generating beams and for emitting the generated beams along a scanning range, using at least one radiation source. In addition, the lidar system includes at least one receiver unit for receiving and evaluating beams reflected or scattered back in the scanning range; the scanning range acted upon by the generated beams being subdivided into at least two sections; and at least one first section being scanned, using a higher radiant power than at least one second section of the scanning range.

According to one further aspect of the present invention, a control unit for controlling and evaluating a lidar system is provided; the control unit being configured to operate the lidar system in such a manner, that a scanning range having at least two sections is scanned, using beams of different radiant power.

The FoV or the scanning range may be subdivided by the lidar system into at least two sections. Each of the sections is acted upon or scanned by beams generated in different manners. This may allow, for example, for the implementation of a section having a large range, but a relatively small beam angle, and a section having a lower range and a larger beam angle.

The at least one first section of the scanning range may be situated within the at least one second section. Alternatively, the sections may be set apart from each other or overlap in areas.

The sections of the scanning range may be formed linearly, rectangularly, triangularly, in a rounded manner, and the like.

Apart from a shape, the specific sections may differ, preferably, in a radiant power, at which they are scanned by generated beams. In this manner, the respective sections may have different ranges.

For example, the first section of the scanning range may be configured to comply with laser class 3R. In this case, the second section may be configured in accordance with laser class 1, which means that the eye safety of persons in the second section of the scanning range is ensured.

The beams generated may be able to be generated by lasers and/or by LED's.

The at least one transmitter unit and the at least one receiver unit are preferably coupled to the control unit, which means that control and adjustment of the specific components of the lidar system may be implemented by the control unit.

According to one specific embodiment of the present invention, the at least one first section of the scanning region is framed by the second section. In this manner, the at least one first section may be situated within the second section. Through this, preferably, the radiant power of the at least one radiation source may be controlled, which subjects a person to a maximum of laser class 1. In particular, the scanning-range section acted upon by a weaker power may be used for detecting people and/or objects, which are not allowed to pass through the scanning-range section acted upon by a higher power.

According to a further specific embodiment of the present invention, the radiant power of the generated beams of the at least one first section of the scanning range may be set to a radiant power of the second section, if an object is positioned within the second scanning range. Consequently, the control of the power of the second section ensures that a person is exposed to a maximum of laser class 1. For this, when the lidar system is switched on, the power in the at least one first section is initially set to the value of the second section of the scanning range. If no object is detected in the scanning range, then the power may be increased to the original value, since then, no person is able to be in this range, as well. The second section formed, for example, in the shape of a frame may ensure that nobody moves from the side into the at least one first section. However, if this is the case, then the power in the first section is adjusted down to the level of laser class 1.

Persons, who approach the lidar system from great distances in the central FoV or in the central scanning range, may be detected in the at least one first section, using a distance measurement.

According to a further exemplary embodiment of the present invention, for acting upon the at least one first section of the scanning range, the lidar system includes a transmitter unit having at least one rotatable radiation source or one radiation source possessing a rotatable mirror for deflecting the generated beams. The sections of the scanning range may be illuminated by two separate systems, which are based on different technologies. Thus, the at least one first section may be acted upon by a scanning or rotating lidar system, using beams. Consequently, the specific sections may have separate transmitter units and/or receiver units, which only scan and evaluate the respective section.

According to a further specific example embodiment of the present invention, the lidar system includes a transmitter unit having at least one pulsed radiation source for acting upon the second section. Consequently, so-called flash lidar may be used in the second section of the scanning range. For this, the low adaptability of the FoV of flashing lidar devices may be used to provide non-variable illumination of the outer range or of the at least one second section. On the other hand, the at least one first section may be implemented with an adaptable system, in which the FoV may be changed dynamically.

According to a further specific example embodiment of the present invention, the at least one first section of the scanning range may be acted upon by a pulsed, two-dimensionally illuminating radiation source, and the second section of the scanning range may be acted upon by a scanning radiation source, using generated beams. This may allow an alternative option to be provided, in which the second section is acted upon by a scanning or rotating lidar system, using generated beams, and the at least one first section is acted upon by a flashing lidar system. The basis of this is that the adaptability of the scanning lidar system ensures that the first section is not also monitored and/or covered simultaneously by the lidar system, which illuminates the second section. Through this, more rapid scanning and lower power consumption may be achieved for the second section.

According to a further embodiment of the present invention, the generated beams for acting upon the at least one first section and the generated beams for acting upon the second section of the scanning range have wavelengths different from each other. This may allow the different sections of the scanning range to be illuminated by beams of different wavelengths. Here, the use of two wavelengths, such as 905 nm and 1550 nm, which do not have to be viewed in an additive manner in accordance with the standard (IEC 60825-1), is particularly advantageous.

According to a further exemplary embodiment of the present invention, a position and/or dimensions of the at least one first section is adaptable as a function of the situation, and/or the at least one first section may be divided into a plurality of first sections. Therefore, in response to the approach of an object, which may potentially be a person, the size of the at least one first section may be adjusted. In particular, the shape of the section may be changed or reduced in size. In addition, the section may be split up, so that the detected object is protected from a higher radiant power.

According to a further embodiment of the present invention, the second section of the scanning range is subdivided into at least two second sections; the at least two second sections being able to be acted upon by beams of different radiant power. Therefore, the at least one second section may be adapted simultaneously to the first section as a function of the situation, as well. For example, a road may be situated in a lower region or section. In this context, a section above the road may be defined or formed, which is acted upon by beams of a higher power for providing a large range. The lower section, which detects the road, may be operated, using a lower power, since the road is detected in a few meters and, therefore, a lot of power is scattered back.

According to a further specific embodiment of the present invention, a position and/or the dimensions of the at least one first section and/or of the at least one second section is/are set on the basis of measurement data of at least one sensor. In this connection, for example, an image of a driver assistance camera or of a radar sensor may be used for the selection of the position and size of the at least one first section, in order to align and adjust the sections of the scanning range in an optimum manner. For this, the additional sensor may be coupled to the control unit so as to be able to transmit data.

According to a further exemplary embodiment of the present invention, the at least one first section and/or the at least one second section of the scanning range are adjustable, if the object is detected within a distance range. This allows a distance range to be defined, in which an object must be located in the second section or monitoring range, in order for the lidar system to react to it. In particular, instances of false detection may be prevented by this measure.

In the following, preferred exemplary embodiments of the present invention are explained in greater detail in light of highly simplified, schematic representations.

DETAILED DESCRIPTION OF EXAMPLE EMBODIMENTS

Figure 1:
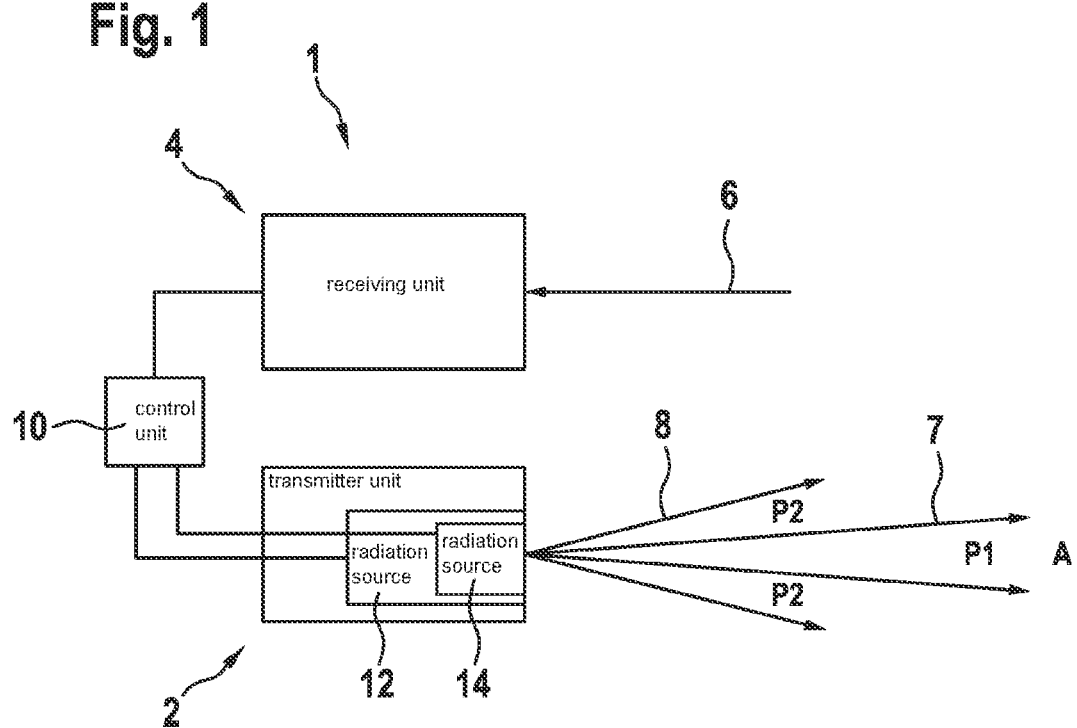
FIG. 1 shows a schematic representation of a lidar system, in accordance with an example embodiment of the present invention.

FIG. 1 shows a schematic representation of a lidar system 1. Lidar system 1 includes a transmitter unit 2 and a receiver unit 4. For the sake of simplicity, receiver unit 4 is not discussed in further detail, but it may include one or more detectors, receiving optics and corresponding electronics for the reading-out of the at least one detector. Receiver unit 4 is used for detecting scattered-back or reflected beams 6.

Beams 7, 8 may be generated by transmitter unit 2 and used for scanning the scanning range A.

Receiver unit 4 and transmitter unit 2 are connected to a control unit 10. In particular, control unit 10 is coupled to two radiation sources 12, 14 of transmitter unit 2 and may control radiation sources 12, 14 on the basis of the measurement data of receiver unit 4.

A first radiation source 12 is used for acting upon a first section P1 of scanning range A, using beams 7. A second radiation source 14 is used for acting upon a second section P2 of scanning range A, using beams 8.

Radiation sources 12, 14 generate beams 7, 8 having wavelengths in the invisible range. For example, the wavelengths of beams 7, 8 may be 905 nm or 1550 nm.

Preferably, the radiation sources may be operated simultaneously to each other.

The power emitted by radiation sources 12, 14 is such, that beams 7 in first section P1 have a higher power than beams 8 in second section P2. For example, beams 8 in second section P2 may comply with the laser class 1 safe for people, while the ones in first section P1 are selected as laser class 3R.

Figure 2:
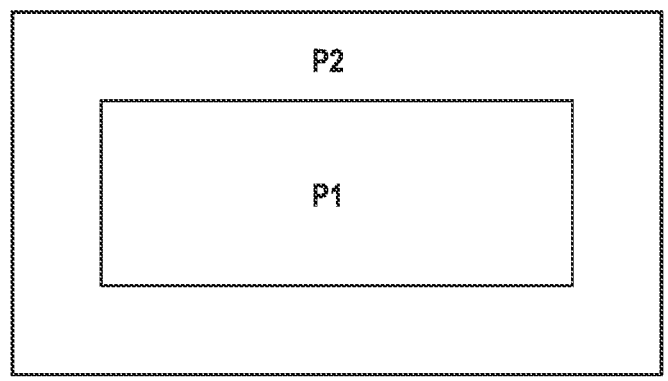
FIG. 2 shows a schematic representation of a scanning range having different sections, in accordance with an example embodiment of the present invention.
Figure 3A:
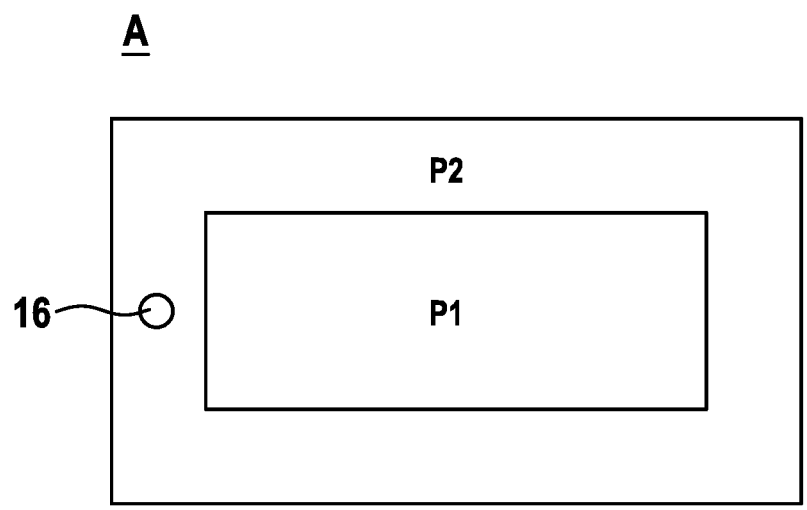
FIG. 3 shows schematic representations of scanning ranges for illustrating an adjustment of at least one first section, in accordance with an example embodiment of the present invention.
Figure 3B:
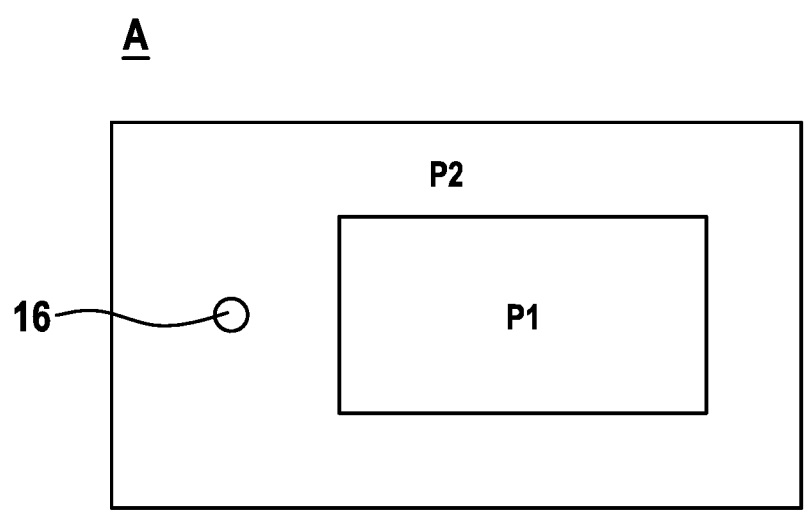
Figure 3C:
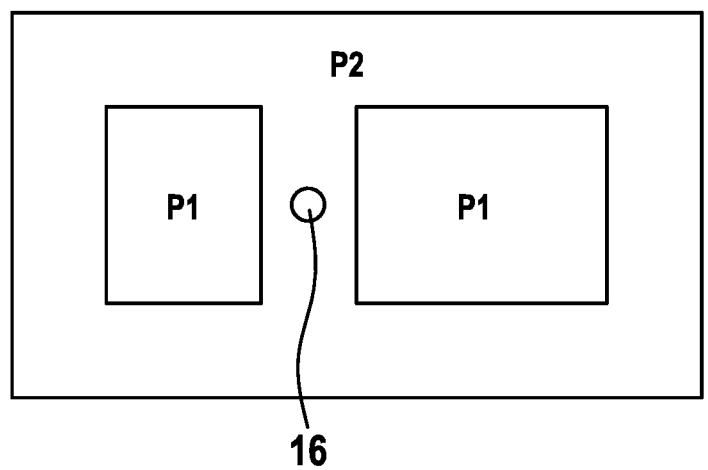
Figure 3D:
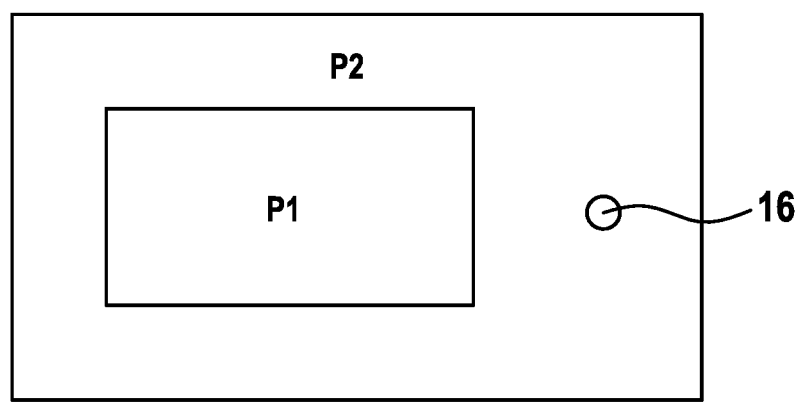

A schematic representation of a scanning range A having different sections P1, P2 is shown in FIG. 2. In particular, scanning range A corresponds to a scanning range, which is acted upon by the lidar system 1 shown in FIG. 1, using beams 7, 8.

The illumination may be accomplished by separate systems, which may use different technologies, such as rotatable lidar or flashing lidar. The two sections P1, P2 may operate, using different wavelengths.

FIG. 3 shows schematic representations of scanning ranges A for illustrating an adjustment of at least one first section P1.

Upon initial operation of lidar system 1, the entire scanning range A made up of sections P1 and P2 is illuminated, using the power of second section P2, and if a person is not detected, the power in first section P1 is increased. The central field, that is, first section P1, is surrounded by a frame made up of second section P2. As soon as an object 16, which could be a person, moves into frame P2, first section P1 is reduced to the level of second section P2. Alternatively, the field of first section P1 may be split up, and only object 16 may be illuminated continually, using the power of first section P1. Persons, who approach in the central FoV, are detected by first section P1. Accordingly, the partitioning of first section P1 and of second section P2 of scanning range A is adapted as a function of the situation. In this connection, combinations of cameras or radar systems may be used, in order to set sections P1, P2 of scanning range A in an optimum manner.

FIGS. 3a through 3d illustrate, in particular, examples as to how first section P1 may be subdivided into a plurality of sections P1 and/or may adjust the size and position in accordance with a detected object 16.

Figure 4:
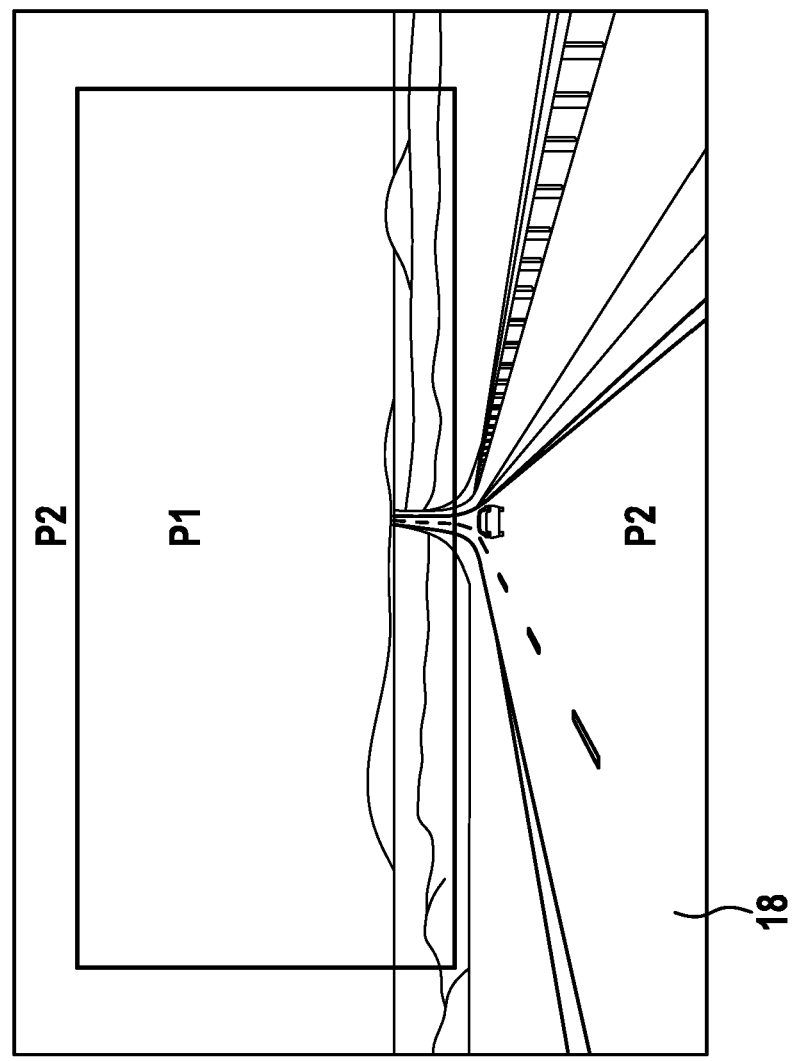
FIG. 4 shows a schematic view of a scanning range having adapted second sections, in accordance with an example embodiment of the present invention.

FIG. 4 illustrates, in a schematic view, a scanning range A including adapted second sections P2.

Here, second section P2 is subdivided into two second sections P2, which are positioned vertically one above the other. First section P1 is also adapted as a function of the situation and is consequently positioned off-center. For example, a road 18 is situated in lower second section P2, which means that first section P1 is set up in the upper scanning range 1 of lidar system 1. Upper second section P2 may be used for carrying out monitoring, that is, upper second section P2 is used for detecting objects 16, which result in a change in first section P1.

Lower second section P2 is illuminated, using reduced power, since road 18 is detected in a few meters and, consequently, a lot of power is scattered back. Detection of objects 16 in the area of the road does not result in any change in the radiant power in first section P1.

What is claimed is:

1. A lidar system for scanning a scanning range, comprising:
    a transmitter unit configured to generate beams and to emit the generated beams along a scanning range, the transmitter unit including at least one radiation source; and
    at least one receiver unit configured to receive and evaluate beams reflected or scattered back in the scanning range;
    wherein:
        the scanning range acted upon by the generated beams is subdivided into a plurality of first sections of the scanning range and a second section of the scanning range;
        the second section is located at a periphery of the plurality of first sections and is scannable by the transmitter unit using up to a first radiant power;
        the plurality of first sections are scannable by the transmitter unit using up to a second radiant power that is higher than the first radiant power;
        the transmitter unit is configured to:
            divide the plurality of first sections into a first part that is scanned using the second radiant power and a second part that is scanned using the first radiant power; and
            adapt the scanning of the plurality of first sections by shifting, with a lateral translation of the first part of the plurality of first sections and the second part of the plurality of first sections resulting in:
                at a first point in time, (I) a first side of the second part of the plurality of first sections bordering the second section at a first side of the plurality of first sections, and (II) the first part of the plurality of first sections (i) bordering the second section at a second side of the plurality of first sections that is opposite the first side of the plurality of first sections and (ii) extending from (a) a second side of the second part of the plurality of first sections, which is opposite the first side of the second part of the plurality of first sections, to (b) the second side of the plurality of first sections bordering the second section;
                at a second point in time that follows the first point in time, (I) a first subpart of the first part of the plurality of first sections bordering the second section at the first side of the plurality of first sections, (II) a second subpart of the first part of the plurality of first sections bordering the second section at the second side of the plurality of first sections, and (III) the second part of the plurality of first sections extending between the first and second subparts of the first part of the plurality of first sections, such that the second part of the plurality of first sections is at a center of the plurality of first sections, with the first and second subparts of the first part of the plurality of first sections (a) being located at respective opposite sides of the second part and (b) respectively bordering the second section at respective opposite sides of the first section; and
                at a third point in time that follows the second point in time, (I) a first side of the first part of the plurality of first sections bordering the second section at the first side of the plurality of first sections, and (II) the second part of the plurality of first sections (i) bordering the second section at the second side of the plurality of first sections that is opposite the first side of the plurality of first sections and (ii) extending from (a) a second side of the first part of the plurality of first sections, which is opposite the first side of the first part of the plurality of first sections, to (b) the second side of the plurality of first sections bordering the second section.

2. The lidar system as recited in claim 1, wherein the plurality of first sections of the scanning range is framed by the second section.

3. The lidar system as recited in claim 1, wherein a radiant power of the generated beams of one or more of the plurality of first sections is adjusted from belonging to the first part to belonging to the second part in response to detection of an object being positioned within or approaching the one or more of the plurality of first sections.

4. The lidar system as recited in claim 1, wherein, for acting upon the plurality of first sections of the scanning range, the transmitter unit has at least one rotatable radiation source or one radiation source possessing a rotatable mirror for deflecting the generated beams.

5. The lidar system as recited in claim 1, wherein, for acting upon the second section, the transmitter unit has at least one pulsed radiation source.

6. The lidar system as recited in claim 1, wherein the plurality of first sections of the scanning range are acted upon by a pulsed, two-dimensionally illuminating radiation source of the transmitter unit, and the second section of the scanning range is acted upon by a scanning radiation source of the transmitter unit, using the generated beams.

7. The lidar system as recited in claim 1, wherein the generated beams for acting upon the plurality of first sections and the generated beams for acting upon the second section of the scanning range have wavelengths different from each other.

8. The lidar system as recited in claim 1, wherein the second section of the scanning range is subdivided into at least two second sections, and the at least two second sections are acted upon by beams generated by the transmitter unit of different radiant power.

9. The lidar system as recited in claim 1, wherein the adapting is performed in response to detection of an approach of an object into a predefined distance from the plurality of first sections.

10. The lidar system as recited in claim 1, wherein the first and second subparts of the first part of the plurality of first sections are of different sizes than each other.

11. The lidar system as recited in claim 1, wherein the transmitter unit is configured to use a different illumination method for scanning the plurality of first sections than for scanning the second section.

12. The lidar system as recited in claim 1, wherein:
for acting upon the plurality of first sections of the scanning range, the transmitter unit has at least one rotatable radiation source or one radiation source possessing a rotatable mirror for deflecting the generated beams; and
for acting upon the second section, the transmitter unit has at least one pulsed radiation source.

13. A method for controlling and evaluating a lidar system for scanning a scanning range, wherein the lidar system includes (a) a transmitter unit configured to generate beams and to emit the generated beams along a scanning range, the transmitter unit including at least one radiation source, and (b) at least one receiver unit configured to receive and evaluate beams reflected or scattered back in the scanning range, the scanning range having a plurality of first sections and a second section that is located at a periphery of the plurality of first sections and is scannable by the transmitter unit using beams of up to a first radiant power, the plurality of first sections being scannable by the transmitter unit using beams of up to a second radiant power that is higher than the first radiant power, the method comprising:
dividing the plurality of first sections into a first part that is scanned using the second radiant power and a second part that is scanned using the first radiant power; and
adapting the scanning of the plurality of first sections by shifting, with a lateral translation of the first part of the plurality of first sections and the second part of the plurality of first sections resulting in:
at a first point in time, (I) a first side of the second part of the plurality of first sections bordering the second section at a first side of the plurality of first sections, and (II) the first part of the plurality of first sections (i) bordering the second section at a second side of the plurality of first sections that is opposite the first side of the plurality of first sections and (ii) extending from (a) a second side of the second part of the plurality of first sections, which is opposite the first side of the second part of the plurality of first sections, to (b) the second side of the plurality of first sections bordering the second section;
at a second point in time that follows the first point in time, (I) a first subpart of the first part of the plurality of first sections bordering the second section at the first side of the plurality of first sections, (II) a second subpart of the first part of the plurality of first sections bordering the second section at the second side of the plurality of first sections, and (III) the second part of the plurality of first sections extending between the first and second subparts of the first part of the plurality of first sections, such that the second part of the plurality of first sections is at a center of the plurality of first sections, with the first and second subparts of the first part of the plurality of first sections (a) being located at respective opposite sides of the second part and (b) respectively bordering the second section at respective opposite sides of the first section; and
at a third point in time that follows the second point in time, (I) a first side of the first part of the plurality of first sections bordering the second section at the first side of the plurality of first sections, and (II) the second part of the plurality of first sections (i) bordering the second section at the second side of the plurality of first sections that is opposite the first side of the plurality of first sections and (ii) extending from (a) a second side of the first part of the plurality of first sections, which is opposite the first side of the first part of the plurality of first sections, to (b) the second side of the plurality of first sections bordering the second section.

* * * * *